United States Patent [19]

Neeley et al.

[11] Patent Number: 5,147,422

[45] Date of Patent: Sep. 15, 1992

[54] PAINT SPRAY BOOTH

[75] Inventors: Thomas S. Neeley; Kenneth N. Kraft; James H. Muehlbauer, all of Evansville, Ind.

[73] Assignee: George Koch Sons, Inc., Evansville, Ind.

[21] Appl. No.: 740,314

[22] Filed: Aug. 5, 1991

[51] Int. Cl.[5] .............................................. B01D 47/10
[52] U.S. Cl. ....................................... 55/90; 55/241; 261/112.1; 454/52; 454/54
[58] Field of Search .................................. 454/52–54; 55/240, 241, 90, DIG. 46; 261/112.1

[56] References Cited

U.S. PATENT DOCUMENTS

| 968,332 | 8/1910 | Dow . | |
|---|---|---|---|
| 2,267,426 | 12/1941 | Saunders et al. | 106/287 |
| 2,719,705 | 10/1955 | Watson | 261/29 |
| 3,119,675 | 1/1964 | Gallagher | 55/257 |
| 3,138,087 | 6/1964 | Larsson et al. | 98/115 |
| 3,138,442 | 6/1964 | Krantz | 55/227 |
| 3,168,030 | 2/1965 | Wilhelmsson et al. | 98/115 |
| 3,168,031 | 2/1965 | Wilhelmsson et al. | 98/115 |
| 3,782,080 | 1/1974 | Gallagher | 55/226 |
| 3,795,093 | 3/1974 | Gerhard et al. | 55/238 |
| 3,934,495 | 1/1976 | Bloomer | 98/115 |
| 4,045,524 | 8/1977 | Bornert | 261/112 |
| 4,057,602 | 11/1977 | Kolm | 261/63 |
| 4,220,078 | 9/1980 | Walker et al. | 98/115 |
| 4,257,784 | 3/1981 | Gebhard et al. | 55/84 |
| 4,328,012 | 5/1982 | Telchuk, Jr. et al. | 55/90 |
| 4,345,921 | 8/1982 | Gustavsson et al. | 55/223 |
| 4,350,506 | 9/1982 | Otto | 55/241 |
| 4,440,554 | 4/1984 | Perry | 55/241 |
| 4,515,073 | 5/1985 | Dorsch et al. | 55/DIG. 46 |
| 4,818,388 | 4/1989 | Morioka et al. | 55/DIG. 46 |
| 4,848,215 | 7/1989 | Morioka et al. | 55/241 |
| 4,885,010 | 12/1989 | Rich et al. | 55/241 |
| 4,952,221 | 8/1990 | Morioka | 55/240 |
| 5,020,470 | 6/1991 | West et al. | 55/240 |

Primary Examiner—Bernard Nozick
Attorney, Agent, or Firm—Barnes & Thornburg

[57] ABSTRACT

A paint spray booth is provided which comprises a floor covered with flowing liquid, the floor including an elongated passageway formed therein defined by a pair of passageway walls and having an entrance opening and an exit opening. The paint spray booth further comprises a mechanism for exhausting air from the booth and pulling a stream of paint particle laden air downwardly through the openings. The booth further comprises a first longitudinally extending concave plate positioned to receive the mixed stream of water and air exiting from the exit opening, and a second longitudinally extending concave plate laterally spaced from the first concave plate. The first and second concave plates cooperate to define a flow chamber therebetween and a discharge opening. The first and second plates are designed to minimize paint buildup in the flow chamber and to trap the noise generated at the discharge opening to reduce the amount of noise returning through the passageway.

28 Claims, 3 Drawing Sheets

PAINT SPRAY BOOTH

BACKGROUND AND SUMMARY OF THE INVENTION

The present invention relates to paint spray booths. More particularly, the present invention relates to a paint spray booth including a wet scrubbing apparatus for removing paint overspray from the paint spray booth.

In paint spray booth operations, excess paint is created which does not adhere to the object being painted. Such excess paint or paint overspray must be removed from the paint booth to maintain a proper working environment and to prepare the booth for subsequent articles to be painted.

Wet scrubbers have proven particularly useful for the elimination of paint overspray. Wet scrubbers use a scrubbing liquid—usually water—to scrub paint particles from a stream of paint-laden air exiting the spray-painting area of a spray booth. Typically, an air stream is passed through the spray-painting area and is drawn through a floor grating. A water stream flows beneath the floor grating and impacts the paint-laden air stream in a scrubbing apparatus.

The scrubbing apparatus should be specially configured to maximize contact between the water stream and the air stream so as to provide highly effective scrubbing. Generally, the scrubbing apparatus is designed to atomize the water stream so that maximum surface area is provided for contact with paint particles in the air stream. The paint particles impact on the water droplets and form agglomerates which will not readily return to the air stream.

While the wet scrubber should be designed for effective atomization of the water stream, other design considerations must also be met. The atomization of the water stream and its impact with the paint-laden air stream create high noise levels. The problem is exacerbated by the high water flow rate (e.g., 20,000 cfm for booths of a typical length) and the high air speed (e.g., 60 mph). The scrubbing apparatus should thus provide means for containing or muffling noice to reduce the amount of noise which can return to the spray painting area of the spray booth.

In addition, the turbulent flow conditions conducive to atomization of the water can cause the water stream to splash against the surfaces of the scrubbing apparatus. Some, portions of the surfaces are contacted or "washed" by the splashing water, while other portions are likely to be left unwashed. Paint particles scrubbed out of the air stream tend to accumulate on the unwashed portions of the surfaces, forming an undesirable buildup of paint.

According to the present invention, a paint spray booth is provided with a first longitudinally extending concave plate and a second longitudinally extending concave plate arranged so as to reduce noise and minimize paint buildup. Specifically, the paint spray booth comprises a floor covered with a flowing liquid, the floor comprising means for defining an elongated passageway therein. The passageway has an upper entrance opening and a lower exit opening through which the liquid flows downwardly as a scrubbing liquid stream. The booth further comprises means for exhausting air from the booth and pulling a paint-laden air stream downwardly through the openings. The entrance opening is positioned to receive the air stream and the scrubbing liquid stream for mixing in the passageway to form a mixed stream. The passageway means comprises a pair of laterally spaced apart, longitudinally and downwardly extending passageway walls.

The booth further comprises a first and a second longitudinally extending concave plane. The first longitudinally extending concave plate is positioned under the exit opening and includes a first reflecting surface facing generally upwardly and positioned to receive the mixed stream exiting the exit opening.

The second longitudinally extending concave plate is laterally spaced apart from the first concave plate and includes a second reflecting surface facing generally downwardly and positioned to oppose the first reflecting surface. The first and second concave plates cooperate to define a longitudinally extending flow chamber and a longitudinally extending discharge opening positioned to discharge the mixed stream from the flow chamber.

Advantageously, at least lower portions of the passageway walls extend into the flow chamber. Thus, noise generated by the mixed stream at the discharge opening and reflecting from the second reflecting surface is directed toward the lower portions. This reduces the amount of noise returning to the passageway means by way of the first reflecting surface.

The present invention also relates to a method for removing paint overspray from a spray booth. The method comprises the steps of forcing a stream of paint-laden air downwardly through an entrance opening into a passageway and flowing a stream of scrubbing liquid into the passageway to mix with the stream of paint-laden air to form a mixed stream. The method further comprises the steps of flowing the mixed stream along a first concave plate, flowing the mixed stream along a second concave plate, and atomizing the mixed stream at a discharge opening to scrub paint particles from the air stream.

Additional objects, features, and advantages of the invention will become apparent to those skilled in the art upon consideration of the following detailed description of preferred embodiments exemplifying the best mode of carrying out the invention as presently perceived by the inventor.

DETAILED DESCRIPTION OF THE DRAWINGS

In a typical down draft water wash spray booth, an enclosed spray paint chamber is provided with a grille floor or floor grating. Air or other gas is blown into the spray chamber from above, capturing excess particulate solids such as paint overspray and directing such particles through the floor grating. Once beneath the floor grating, the paint-laden air stream is forced through a paint elimination section where it mixes with a flowing water stream. The water stream scrubs the paint particles from the air stream. The air stream can then be exhausted from the paint spray booth in an environmentally-sound manner and the paint-laden water can be recycled for reuse in the scrubbing operation.

Paint booths are typically elongated with an entrance door or opening at one end and an exit door or opening at the other end. Products to be spray painted are typically moved on conveyor means through the entrance door, longitudinally through the booth, and out the exit door. For purposes of describing this invention, the term "longitudinal" is intended to define a direction through the booth and the terms "lateral" or "laterally spaced" are intended to refer to directions away from the longitudinal direction or toward the sidewalls of the booth. That is, for purposes of FIGS. 1 and 3, the term "longitudinal" refers to that which lies in a plane perpendicular to the plane of the paper. For purposes of FIG. 2, the longitudinal direction is the direction indicated by arrow 25.

Figure 1:
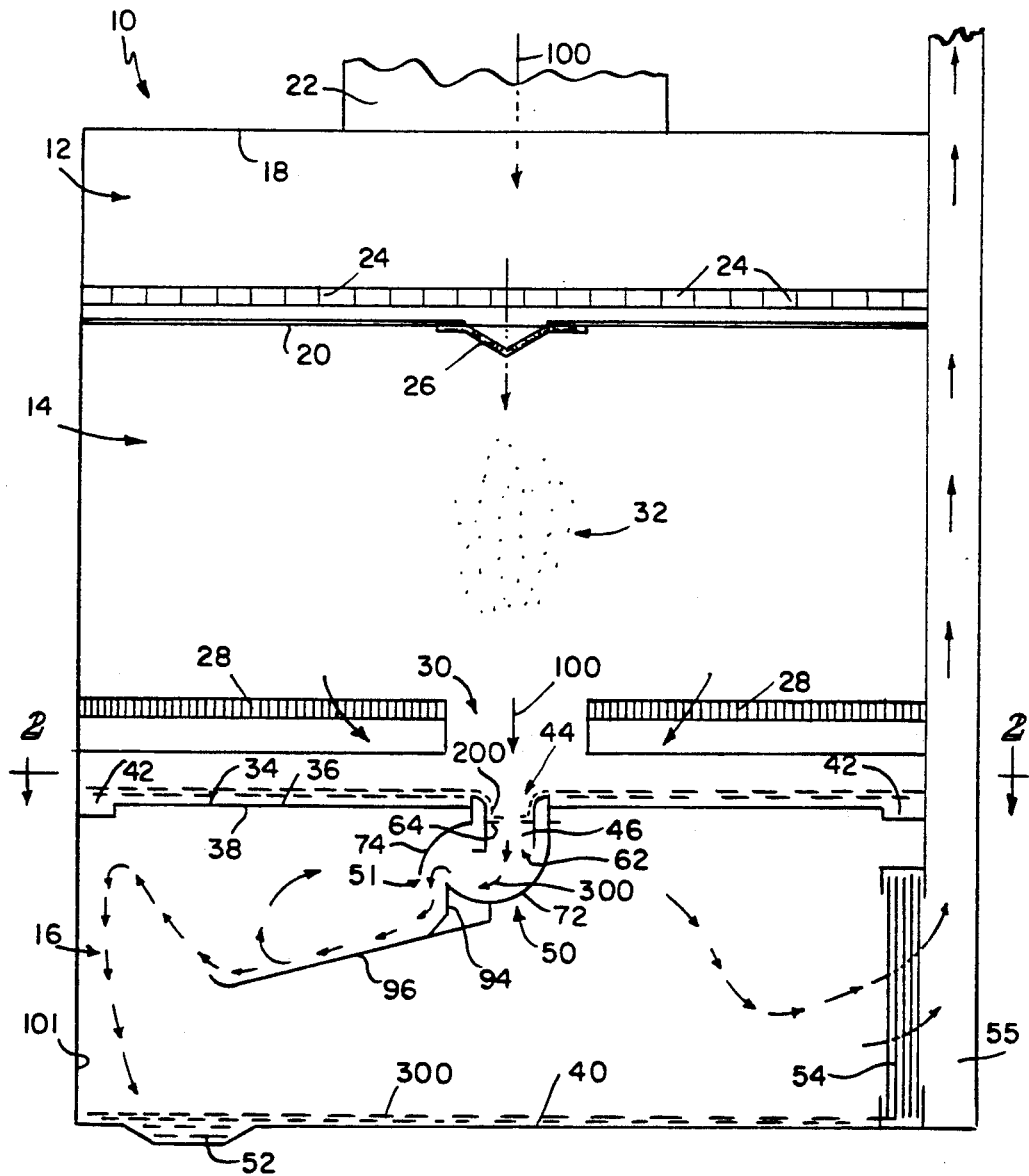
FIG. 1 is an end view of a paint spray booth in accordance with the present invention with portions broken away to show the interior thereof.
Figure 2:
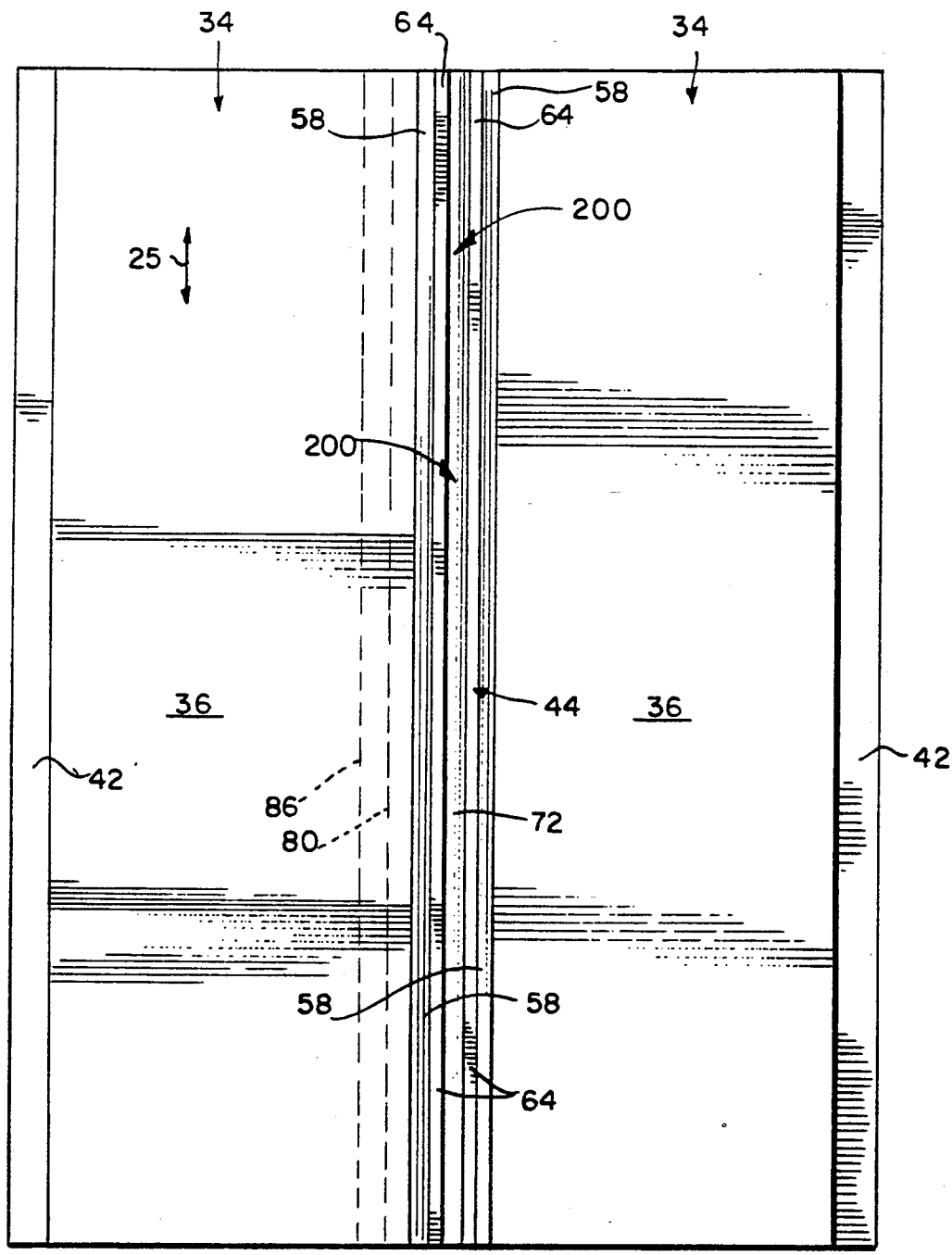
FIG. 2 is a top sectional view taken along lines 2—2 of FIG. 1 showing an eliminator section of the paint spray booth of FIG. 1.

A paint spray booth 10 in accordance with the present invention is illustrated in FIGS. 1 and 2. Paint spray booth 10 comprises an air supply section or plenum 12, a spray paint application section or spray point chamber 14, and a paint elimination section 16.

Air supply section 12 is defined at its upper end by ceiling 18 and at its lower end by a frame 20.

An air supply duct 22 (shown in fragment in FIG. 1) extends through ceiling 18. A plurality of longitudinally-extending, horizontally-arranged air diffusion panels 24 lie between ceiling 18 and frame 20. A final air supply filter 26 is suspended by frame 20 below air diffusion panels 24. Filter 26 is preferably a V-shaped filter extending along a longitudinal centerline of paint spray booth 10.

Thus, as shown, an air stream 100 which is forced through supply duct 22 passes next through diffusion panels 24, and then through filter 26, whereupon stream 100 reaches spray paint application section 14.

Section 14 is defined at its upper end by frame 20 and at its lower end by a floor grating 28. Floor grating 28 is split along a longitudinal centerline thereof to provide a space through which an air flow opening 30 extends. Air flow opening 30 allows air flow between application section 14 and elimination section 16. Electrostatic paint spray guns (not shown) having standard nozzle sizes and operating at standard pressures are provided in application section 14. As shown, paint overspray particles 32 generated through use of the paint spray guns are captured by air stream 100 and directed toward air flow opening 30 to reach eliminator section 16.

Eliminator section 16 is defined at its upper region by a floor 34 having an upwardly facing surface 36 and a downwardly facing surface 38. Section 16 is defined at its lower end by a foundation floor 40.

A flowing water stream 200 covers surface 36 of floor 34. An overflowing water trough 42 is provided at either side of floor 34 to provide water stream 200. A first or entrance opening 44 to a passageway 46 is formed along a longitudinal centerline of floor 34. Air stream 100 and water stream 200 enter first opening 44 to mix together to form a mixed stream 300.

Stream 300 passes through an elimination apparatus 50, shown in more detail in FIG. 3 and further described below. In elimination apparatus 50, the water component of mixed stream 300 scrubs paint particles from the air component thereof.

After it exits elimination apparatus 50 by way of a second or discharge opening 51, the water component of mixed stream 300 (now laden with paint) eventually flows across foundation floor 40 to a longitudinally extending return trench 52 formed therein. The water component flows in trench 52 to a location (not shown) where the "dead paint" is removed from the water by settling or other processes and from which the water can be redirected across surface 36 for reuse in the scrubbing or elimination step.

The air component of mixed stream 300 (now scrubbed of paint) is directed toward a plurality of vertically arranged moisture eliminators 54, which separate any remaining water droplets from the air component. An exhaust duct 55 is provided adjacent moisture eliminators 54 for exhausting the scrubbed air component from elimination section 16.

Figure 3:
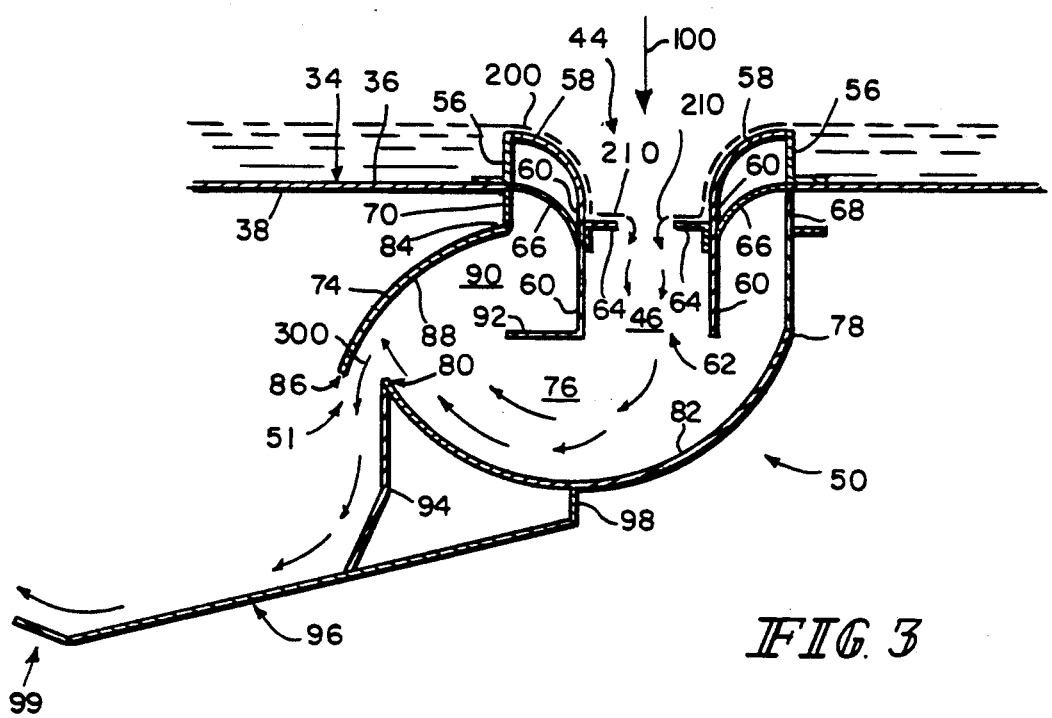
FIG. 3 is an enlarged end view of a paint elimination section of FIG. 1 showing a first and a second concave plate which cooperate to define a flow chamber for a water stream and a paint-laden air stream.

Elimination apparatus 50 and its surrounding structure are shown in greater detail in FIG. 3. As described below, elimination apparatus 50 is designed to maintain a particular flow characteristic between first opening 44 and second opening 51 which provides substantial turbulence to maximize the surface area of scrubbing liquid available for scrubbing while minimizing noise and paint buildup in elimination apparatus 50.

As noted, water stream 200 flows over surface 36 toward first opening 44. Typically, the water (or other scrubbing liquid) in water stream 200 stands about four (4) inches deep on surface 36. First opening 44 is defined by a pair of angle irons providing longitudinally extending weirs 56. Weirs 56 function to retain nearly all of the water on surface 36, allowing only a very thin sheet of water (e.g., about ⅝ inch deep) to flow into first opening 44.

As shown in FIG. 3, a pair of longitudinally extending, opposed, arcuate walls 58 border first opening 44. The selection of the smooth convergent walls 58 and the use of weirs 56 both are motivated in part by the desire to avoid paint buildup in elimination apparatus 50. Advantageously, weirs 56 allow only a thin sheet of water to flow along opposed, arcuate walls 58. Were weirs 56 omitted, splashing might occur as water cascaded down arcuate walls 58. It is anticipated that such splashing would cause the water to jump over certain portions of walls 58 so as to leave them "unwashed." Paint particles from air stream 100 would tend to adhere to and accumulate on the unwashed portions, resulting in undesirable paint buildup and concomitant loss of performance.

Splashing is also advantageously minimized by the use of smoothly curved surfaces for walls 58. If joined, angled plates were used, such that the water stream was forced to cross a sharply-angled surface, the water stream might tend to short circuit the sharply-angled surface, leaving an unwashed area for paint buildup.

Arcuate walls 58 terminate in longitudinally and downwardly or vertically extending wall portions 60 as shown in FIG. 3. An exit opening 62 is defined at the lower end of vertical wall portions 60.

Wall portions 60 provide means for defining elongated passageway 46. Passageway 46 may also be viewed as an impaction zone in which water from water stream 200 mixes with paint-laden air from air stream 100 to form mixed stream 300. Passageway or impaction zone 46 is defined between walls 60, entrance opening 44, and exit opening 62. Passageway 46 may illustratively be about one (1) foot wide and about one and two-thirds (1⅔) feet long (the latter dimension being measured along the path of air stream 100). Paint-laden air stream 100 first impacts with water 100 in impaction zone 46. However, most of the atomization of the water stream 200 (and hence most of the scrubbing action) occurs at second opening 51, as will be subsequently described.

A pair of longitudinally and inwardly extending, horizontally arranged plates 64 extend into first opening 44. Advantageously, plates 64 (sometimes referred to as "kickers") serve to reduce noise traveling from elimination section 16 to spray paint application section 14. In addition, kickers 64 also can enhance the ability of water stream 200 to eliminate paint particles from air stream 100 by forcing water stream 200 to mix with air stream 100.

Specifically, water stream 200 passes through first opening 44 and is directed into impaction zone 46, thereby forming a sheet of water 210. Sheet of water 210 forms a barrier or acoustical block to noise generated further downstream in impaction zone 46 or elsewhere in elimination apparatus, particularly at discharge opening 51. Sheet 210 is also positioned directly int he path of air stream 100. Thus, air stream 100 is forced to impact water stream 200 to form mixed stream 300.

The means for defining passageway 46 also includes a pair of curved plates 66. As shown, curved plates 66 extend from floor 34 to passageway wall portions 60 to provide support for passageway wall portions 60. Plates 66 have larger radii of curvature than do arcuate walls 58. However, this need not be the case. Any plate configuration providing adequate support to passageway wall portions 60 can be used and are within the scope of the present invention. It is anticipated that plates 66 can be eliminated in some circumstances.

The means for defining passageway 46 further includes a pair of longitudinally extending, vertically arranged attachment plates 68 and 70. Plate 68 is similar in length to passageway wall portions 60, while plate 70 is of a length such that it terminates in the same horizontal plane in which kickers 64 lie.

Advantageously, elimination apparatus 50 includes a first longitudinally extending concave plate 72 and a second longitudinally extending concave plate 74. First concave plate 72 cooperates with second concave plate 74 to provide a flow chamber 76 for receiving mixed stream 300. Concave plates 72, 74 are arranged to provide a flow characteristic for mixed stream 300 which minimizes the formation of unwashed surface portions on which paint particles tend to accumulate.

First concave plate 72 includes a longitudinal edge 78 appended to vertical plate 68 and a free edge 80. First concave plate 72 also includes a first reflecting surface 82 facing generally upwardly and positioned to receive mixed stream 300 as that stream exits exit opening 62.

First concave plate 72 has an arc angle of somewhat less than 180° (and greater than about 150°) such that free edge 80 lies in a different horizontal plane than does longitudinal edge 78, giving first concave plate 72 a slightly canted appearance. In preferred embodiments, first concave plate 72 has a radius of curvature equal to the radius of curvature of second concave plate 74. First concave plate 72 is illustratively positioned so that its lowermost point is aligned along a vertical line with one of passageway walls 60.

Second concave plate 74 has a longitudinal edge 84 appended to vertical plate 70 and a free edge 86. Second opening 51 is defined between free edge 86. Second opening 51 is defined between free edge 86 and free edge 80. As shown, free edges 80 and 86 are positioned in horizontal alignment, to provide a longitudinally extending, downwardly directed opening 51.

Second concave plate 74 is spaced apart laterally (i.e., sideways in FIG. 3) from first concave plate 72 and includes a second reflecting surface 88 facing general downwardly in opposition to first reflecting surface 82. Second concave plate 74 has an arc angle of about 90°—that is, about half of the arc angle of first concave plate 72.

While concave plates 72 and 74 have the same radii of curvature, the center of curvature of plate 74 is spaced apart both laterally and vertically from the center of curvature of plate 72. Second concave plate 74 has its maximum height at longitudinal edge 84.

As shown in FIG. 3, plate 74 is positioned so that second reflecting surface 88 receives the flow of mixed stream 300 after that stream has swept along first reflecting surface 82 of plate 72. Plate 74 is designed to redirect mixed stream 300 toward second opening 51. Advantageously, concave plates 72 and 74 cooperate to force mixed stream 300 along a tortuous path, making it more difficult for noise to travel back upstream to spray paint application section 14.

In addition, plate 74 is advantageously arranged so that second reflecting surface 88 receives noise from first reflecting surface 82 and reflects noise toward passageway walls 60. A substantial amount of noise is thus trapped in a region 90, reducing the amount of noise which returns to first reflecting surface 82. Passageway wall 60 thus provides a sound baffle in flow chamber 76. Such an arrangement may reduce noise levels in the paint spray booth from about 85dB to about 82dB.

Optionally, a longitudinally extending, horizontally arranged plate 92 is appended to one of passageway walls 60 at the lower end thereof. It is thought that optional plate 92 may further contain noise in region 90.

As noted, second opening 51 is defined by free edges 80, 86 and is offset from first opening 44 so that no direct line of sight exists between the two openings. As second opening 51 is substantially smaller than first opening 44 (less than half the width of first opening 44 in preferred embodiments), the majority of the atomization of the water stream occurs at second opening 51.

The basic principles underlying the scrubbing operation which occurs at discharge opening 51 can readily be summarized by reference to three distinct phenomena: inertial deposition, deposition by interception, and deposition by Brownian motion. All of the phenomena involve interactions between droplets of the scrubbing liquid (e.g., water droplets from stream 200) and individual solid particles (usually paint particles).

Inertial deposition arises from direct collisions between water droplets and paint particles of similar sizes. It is known that paint particles will collide with similarly sized water droplets and will be captured by such droplets, thus becoming removed from or scrubbed out of the air stream. Thus, where a water stream can be appropriately atomized, larger paint particles can be captured by inertial deposition to form paint agglomerates.

Paint particles which are small relative to the atomized water droplets typically cannot be captured by inertial deposition. Rather, such particles tend to "break" around the water droplet. As the water droplet picks up speed, the paint particle may ride alongside the water droplet. As the particle and the water droplet move together alongside one another at the same speed, the particle may eventually become "intercepted" by the water droplet.

For particles which are extremely small relative to the water droplets (i.e., in the range of about one (1) micron in size) deposition will occur, if at all, by Brownian motion. That term as used herein refers to the tendency of extremely small particles to move randomly, not identifying with either air stream 100 or water stream 200. In fact, some such extremely small particles might move transverse to the flow of air and water. Deposition will occur only when a particle happens to strike a water droplet in such a manner as to allow the particle to diffuse into the water droplet.

Once mixed stream 300 passes through second opening 51, stream 300 flows along a nearly vertical flow plate 94 illustratively appended to free edge 80 of first concave plate 72. An angled plate 96 is provided for receiving flow from flow plate 94.

Angled plate 96 is illustratively appended to first concave plate 72 at or near the lowermost portion thereof by way of a bracket 98. Angled plated 96 includes an upturned end 99 at the downstream end thereof. Upturned end 99 serves dual functions. First, it directs mixed stream 300 (and particularly the paint-laden water stream component thereof) toward downwardly facing surface 38 to wash surface 38 on impact therewith.

Second, upturned end 99 helps separate the water and air components of mixed stream 300 by gravity separation. The paint-laden water component impacts surface 38 and flows down a sidewall 101, eventually reaching return trench 52. Return trench 52 may optionally be provided with a baffle (not shown) to help prevent foam from traveling from return trench 52 to moisture eliminators 54. The air component is directed toward moisture eliminators 54 and thence to exhaust duct 55 as previously described.

To summarize the operation of elimination apparatus 50, a paint-laden air stream 100 enters first opening 44. A water stream 200 enters first opening 4 and impacts kickers 64 to form a substantially horizontal sheet of water 210. Air stream 100 passes through sheet of water 210 and impacts with the water in passageway 46 to form a mixed stream 300.

Mixed stream 300 flows along first concave plate 72 and is directed toward second reflecting surface 88 of second concave plate 84. Mixed stream 300 is then directed toward second opening 51, where the water component of the mixed stream 300 is substantially atomized so as to scrub paint particles from the air component thereof. Noise generated at second opening 51 in the scrubbing process can travel back to second reflecting surface 88. Some noise will be reflected back to first reflecting surface 82, but a substantial amount will be directed against passageway wall 60 to be trapped in region 90. Mixed stream 300 then exits second opening 51 and is thereafter separated into a paint-laden water component and a scrubbed air component.

The method in accordance with the present invention proceeds essentially as summarized above. The method comprises the steps of pulling paint-laden air stream 100 downwardly through first opening 44 and mixing air stream 100 with water stream 200 in passageway 46 to form mixed stream 300. The method further comprises the steps of flowing mixed stream 300 along first concave plate 72 and flowing mixed stream 300 along second concave plate 74. The method still further comprises the step of atomizing the water component of mixed stream 300 at second opening 51 to scrub paint particles from the air component.

Although the invention has been described in detail with reference to certain preferred embodiments, variations and modifications exist within the scope and spirit of the invention as described and defined in the following claims.

What is claimed is:

1. A method for removing paint overspray from a paint spray booth, the paint spray booth comprising a floor covered with flowing liquid, said floor comprising means for defining an elongated passageway therein having an upper entrance opening and a lower exit opening and including a pair of laterally spaced apart, longitudinally and downwardly extending passageway walls, the paint spray booth further comprising a first longitudinally extending concave plate and a second longitudinally extending concave plate and spaced apart from the first concave plate with concave faces of the two plates facing each other where the first faces upwardly and the second faces downwardly to define a longitudinally extending flow chamber and longitudinally extending discharge opening therebetween, the method comprising the steps of:

forcing a stream of paint-laden air downwardly through the entrance opening into the passageway, flowing a stream of scrubbing liquid into the passageway to mix with the stream of paint-laden air to form a mixed stream, flowing the mixed stream downwardly against the concave face of the first concave plate to deflect the mixed stream upwardly to flow against the opposed concave face of the second concave plate to deflect the mixed stream downwardly to be atomized at the discharge opening to scrub paint particles from the air stream.

2. The method of claim 1, further comprising of the step of separating the mixed stream exiting the discharge opening into a paint-laden scrubbing liquid stream and a scrubbed air stream.

3. The method of claim 2, further comprising the steps of flowing the scrubbing liquid stream against a pair of horizontally arranged plates to form a substantially horizontal sheet of scrubbing liquid and passing the air stream through the sheet of scrubbing liquid to form the mixed stream.

4. A paint spray booth comprising a floor covered with flowing liquid, said floor comprising means for defining an elongated longitudinally extended passageway therein having an upper entrance opening and a lower exit opening through which the liquid flows downwardly as a scrubbing stream, means for exhausting air form said booth and pulling a stream of paint particle laden air downwardly through said openings, said entrance opening being positioned to receive the air stream and the scrubbing liquid stream for mixing in the passageway to form a mixed stream, the passageway means comprising a pair of laterally spaces apart, longitudinally and downwardly extending passageway walls, a first longitudinally extending concave plate under said exit opening and including a first concave reflecting surface facing generally upwardly and positioned to receive and deflect the mixed stream exiting the exit opening, and a second longitudinally extending concave plate laterally spaced from the first concave plate and including a second concave reflecting surface facing generally downwardly and positioned to oppose the first reflecting surface and to receive and further deflect the deflected mixed stream from the first reflecting surface, the first and second concave plates cooperating to define a longitudinally extending flow chamber between their reflecting surface and to define a longitudinally extending discharge opening positioned to discharge the twice deflected mixed stream from the flow chamber, at least lower portions of the passageway walls extending into the flow chamber so that noise generated by the mixed stream at the discharge opening and reflecting from the second reflecting surface is directed toward the lower portions to reduce the amount of nose returning to the passageway means by way of the first reflecting surface.

5. The paint spray booth of claim 4, wherein the first concave plate includes a lowermost portion positioned in vertical alignment with a first of the pair of passageway walls.

6. The paint spray booth of claim 4, wherein the first concave plate has an arc angle of between 150° and 180° and the second concave plate has an arc angle of substantially half of that of the first concave plate.

7. The paint spray booth of claim 4 wherein the second concave plate is positioned above the discharge opening.

8. The paint spray booth of claim 4, wherein the discharge opening is sized to atomize substantially all of the scrubbing liquid in the mixed stream.

9. The paint spray booth of claim 4, further comprising a longitudinally extending, horizontally arranged plate appended to a lower end of a first of the air of passageway walls to assist in preventing sound reflected from the second reflecting surface from returning to the first reflecting surface.

10. The paint spray booth of claim 4, further comprising means for using the scrubbing liquid to form an acoustical block in the passageway, the using means including a pair of plates extending horizontally into the passageway on opposing sides thereof to direct the scrubbing liquid across the entrance opening to form a sheet of liquid to reduce the escape of noise from the passageway means.

11. The paint spray booth of claim 4 wherein the first concave plate includes a longitudinal edge appended to the passageway means and a free edge, the second concave plate includes a longitudinal edge appended to the passageway means and a free edge, and the discharge opening is defined as a space between the respective free edges.

12. The paint spray booth of claim 11, wherein the free edges are positioned in horizontal alignment.

13. The paint spray booth of claim 4, wherein the first concave plate has a radius of curvature and the second concave plate has an equal radius of curvature.

14. The paint spray booth of claim 13, wherein the first concave plate has a center of curvature which is spaced apart laterally and downwardly from a center of curvature of the second concave plate.

15. A paint spray booth comprising a floor, means for covering said floor with a scrubbing liquid, said floor having a longitudinally extending, laterally narrow first opening, means for exhausting air from said booth downwardly through said first opening to form an air stream, said first opening means including a pair of opposed, convergent, spaced apart arcuate walls, the walls defining an impaction zone in the space therebetween, whereby the means for covering the floor with liquid causes the liquid to flow across said pair of arcuate walls toward said impaction zone, a pair of longitudinally extending plates appended to the respective arcuate walls and extending horizontally into the first opening at the impaction zone to direct scrubbing liquid flowing across the arcuate walls into the impaction zone to impact with the air stream to form a mixed stream, and longitudinally extending chamber means for receiving the mixed stream from the impaction zone, the chamber means being formed to include a second longitudinally extending exit opening in spaced-part, generally parallel relationship with the first opening so that no direct line of sight exists between the first and second openings, the chamber means further comprising a first longitudinally extending concave plate, the first concave plate positioned to receive the mixed stream from the impaction zone and second longitudinally extending concave plate which is positioned to receive the mixed stream from the first concave plate and to direct the mixed stream toward the second opening.

16. The paint spray booth of claim 15, wherein the second concave plate is laterally displaced from the first concave plate.

17. The paint spray booth of claim 15, wherein the arcuate walls terminate in vertical wall portions and the first concave plate includes a lowermost portion positioned in vertical alignment with a first of the vertical wall portions.

18. The paint spray booth of claim 15, where in the first concave plate has an arc angle of between 150° and 180° and the second concave plate has an arc angle of substantially half of that of the first concave plate.

19. The paint spray booth of claim 15, in the second concave plate is positioned above the second opening.

20. The paint spray booth of claim 15, wherein the second opening is sized to atomize substantially all of the scrubbing liquid in the mixed stream.

21. The paint spray booth of claim 15, wherein there is a housing having a ceiling located beneath the floor and further comprising mans for separating the mixed stream discharged from the second opening into a particulate-laden scrubbing liquid stream and a scrubbed air stream, the separating means including a downwardly angled plate having an upturned plate at its downstream end so that the particulate-laden scrubbing liquid stream and the scrubbed air stream are directed toward the ceiling of the housing to wash the ceiling and to separate water and air components from the scrubbed air stream by gravity.

22. The paint spray booth of claim 15, wherein the arcuate walls terminate in vertical wall portions and the horizontal plates are appended to the vertical wall portions.

23. The paint spray booth of claim 22, wherein the vertical wall portions extend into the chamber means a sufficient distance so that noise generated at the second opening and reflected from the second concave plate is directed against the vertical wall portion.

24. The paint spray booth of claim 22, further comprising a longitudinally extending, horizontally arranged plate appended to a lower end of a first of the vertical wall portions to assist in preventing noise generated at the second opening and reflected from the second concave plate from reaching the first concave plate.

25. The paint spray booth of claim 15, wherein the first concave plate includes a longitudinally extended edge appended to the providing means and a free longitudinally extending edge, the second concave plate includes a longitudinally extending edge appended to the providing means and a free longitudinally extending edge, and the second opening is defined as a space located between the free edges.

26. The paint spray booth of claim 25, wherein the free edges are positioned in horizontal alignment.

27. The paint spray booth of claim 15, wherein the first concave plate has a radius of curvature and the second concave plate has an equal radius of curvature.

28. The paint spray booth of claim 27, wherein the first concave plate has a center of curvature which is spaced apart laterally and upwardly from a center of curvature of the second concave plate.

* * * * *